US009415862B2

(12) United States Patent
Golborne et al.

(10) Patent No.: US 9,415,862 B2
(45) Date of Patent: Aug. 16, 2016

(54) CONTROL INTERFACE, SYSTEM AND METHOD

(71) Applicant: Merlin Technology, Inc., Kent, WA (US)

(72) Inventors: Carlos E. Golborne, Redmond, WA (US); Ray E. Debs, Gig Harbor, WA (US); Mark Marvin, Tacoma, WA (US); John E. Mercer, Gig Harbor, WA (US)

(73) Assignee: Merlin Technology, Inc., Kent, WA (US)

( * ) Notice: Subject to any disclaimer, the term of this patent is extended or adjusted under 35 U.S.C. 154(b) by 394 days.

(21) Appl. No.: 14/133,601

(22) Filed: Dec. 18, 2013

(65) Prior Publication Data

US 2015/0329199 A1 Nov. 19, 2015

(51) Int. Cl.
*B64C 13/18* (2006.01)
*B64C 13/22* (2006.01)
*B64C 27/04* (2006.01)
*G05G 9/047* (2006.01)

(52) U.S. Cl.
CPC ............... *B64C 13/18* (2013.01); *B64C 13/22* (2013.01); *B64C 27/04* (2013.01); *G05G 2009/04774* (2013.01)

(58) Field of Classification Search
CPC ...... B64C 13/22; B64C 13/503; B64C 13/50; G05G 2009/04774; B60K 2350/307
See application file for complete search history.

(56) References Cited

U.S. PATENT DOCUMENTS 5,389,950 A * 2/1995 Bouton ................ A63F 13/06 345/156
7,265,699 B1 9/2007 Johnson et al.
2013/0327880 A1 12/2013 Certain

FOREIGN PATENT DOCUMENTS

WO 2013/169320 A2 11/2013

OTHER PUBLICATIONS

The International Search Report and Written Opinion of the International Searching Authority for International Application No. PCT/US2015/012951 which is associated with U.S. Appl. No. 14/133,601, Mar. 3, 2016, Moscow, Russia.

* cited by examiner

*Primary Examiner* — Brian M O'Hara
(74) *Attorney, Agent, or Firm* — Pritzkau Patent Group, LLC

(57) ABSTRACT

A pilot control interface and method are described for selective control of an autopilot system by a pilot of an aircraft in which the autopilot system is installed. The pilot control interface includes a passive network that is selectively switchable between a plurality of states across an output interface that is made up of no more than two conductors that are in electrical communication with the autopilot system. Modification of a current autopilot flight mode can be performed incrementally or continuously based on respective momentary and continuous pilot input actuations.

27 Claims, 8 Drawing Sheets

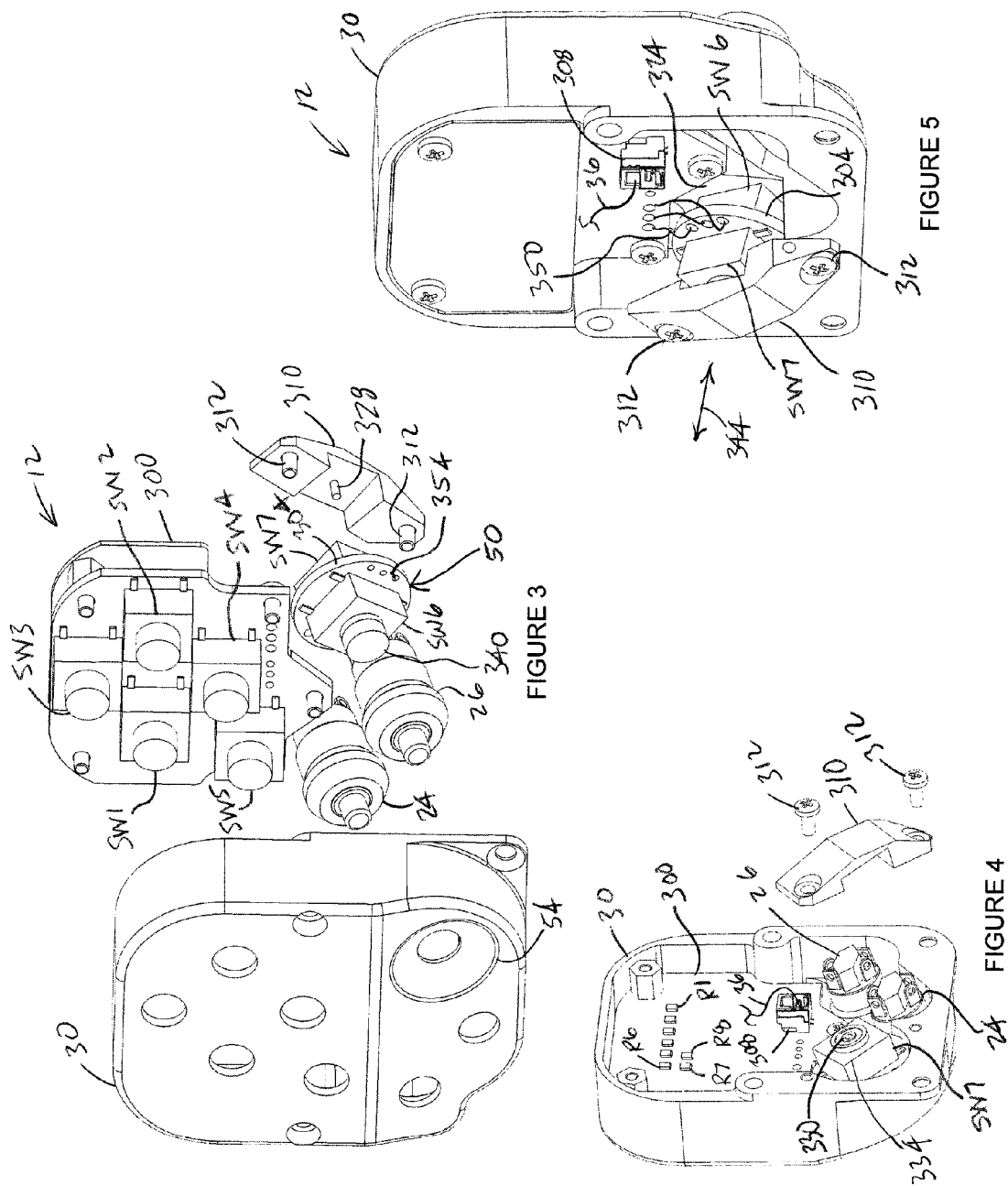

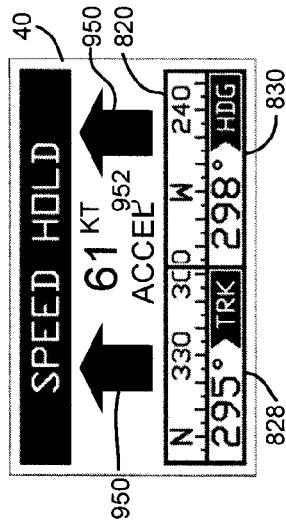
FIGURE 10
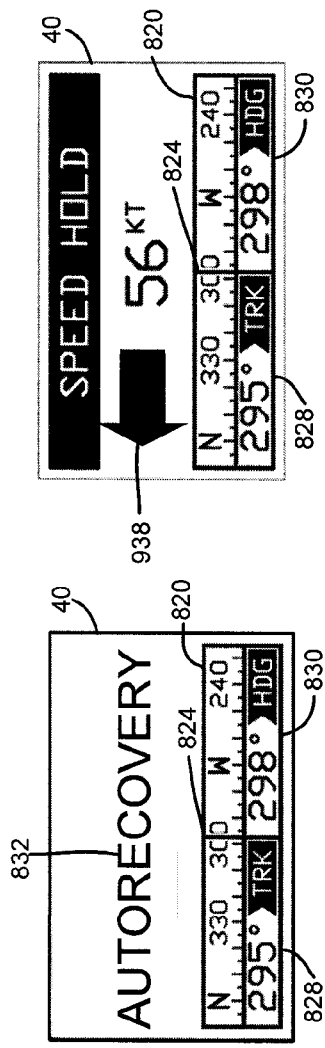
FIGURE 11
FIGURE 12
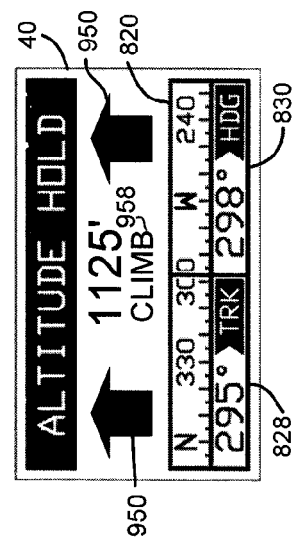
FIGURE 13
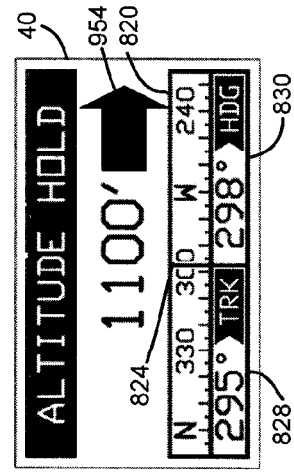
FIGURE 14

CONTROL INTERFACE, SYSTEM AND METHOD

BACKGROUND

The present application is generally related to a control system and, more particularly, to a control interface for a control system and associated methods. Further, a method and associated apparatus for managing rotorcraft flight are described.

Control systems can generally be subject to stringent requirements, for example, with respect to reliability. Using the framework of an aircraft autopilot by way of example, it is necessary that the autopilot does not produce any operational condition of the helicopter or other aircraft that could present an operational risk or induce an emergency condition. Such reliability considerations also apply to a pilot control interface that is provided for purposes of allowing the pilot to control the autopilot. For instance, the possibility of an unintentional disengagement of the autopilot should be avoided. The pilot control interface often utilizes a plurality of electrical switches that are accessible to the pilot for controlling the various functions of the autopilot such as flight control mode and engagement/disengagement. Of course, it is necessary to electrically interface these switches to the control unit of the autopilot. In terms of reliability of this electrical interface, it is submitted that the perception of the prior art centers on an electrical architecture that utilizes individual electrical conductors connected to each switch and extending from each switch to the autopilot or central control unit. Applicants recognize, in this regard, that there can be limitations involved when this architecture is employed, as will be further discussed below.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In one aspect of the disclosure, a pilot control interface and associated method are described for selective control of an autopilot system by a pilot of an aircraft in which the autopilot system is installed. The pilot control interface includes an electrical resistance network that is selectively switchable between a plurality of states. A plurality of switches is arranged for pilot interaction therewith to selectively switch the electrical resistance network between the states such that each state exhibits an output resistance across an output interface that is made up of no more than two conductors that are in electrical communication with the autopilot system.

In another aspect of the disclosure, a pilot control interface and associated method are described for selective control of an autopilot system by a pilot of an aircraft in which the autopilot system is installed. The pilot control interface includes a network of passive electrical components that is selectively switchable between a plurality of states responsive to pilot interaction with a plurality of switches such that each state exhibits an output characteristic across an output interface that is made up of no more than two conductors.

In still another aspect of the disclosure, an autopilot system and associated method are described for selective control of an aircraft. Accordingly, one or more actuators control communication with one or more flight controls of the aircraft. An autopilot controller is in electrical communication with the actuators and configured for automatic control of the aircraft in one or more flight modes and a pilot control interface includes (i) an electrical resistance network that is selectively switchable between a plurality of states and (ii) a plurality of switches for pilot interaction therewith to selectively switch the electrical resistance network between the states such that each state exhibits an output resistance across an output interface that is made up of no more than two conductors that are in electrical communication with the autopilot controller.

In a further aspect of the disclosure, an autopilot system and associated method are described for controlling the flight of a helicopter having a control stick that is operable by the pilot to manually control the flight of the helicopter. Accordingly, an input arrangement is located on the control stick including a left switch, a right switch, a fore switch and an aft switch. An actuator arrangement receives a set of control signals to control the flight of the helicopter in a current flight mode of the autopilot and a processing section monitors the flight of the helicopter to generate the set of control signals responsive to the monitoring and to respond to a pilot actuation of one of the switches by changing a flight parameter of the helicopter relating to the current flight mode.

BRIEF DESCRIPTION OF THE DRAWINGS

Exemplary embodiments are illustrated in referenced figures of the drawings. It is intended that the embodiments and figures disclosed herein are to be illustrative rather than limiting.

FIG. 3 is a diagrammatic partially exploded view, generally from a front perspective, of an embodiment of the autopilot control interface, shown here to illustrate details of its structure.

FIG. 4 is another partially exploded view, generally from a rear perspective, of the embodiment of the autopilot control interface of FIG. 3, shown here to illustrate further details of its structure.

FIG. 5 is an assembled view, taken generally from a rear perspective, of the autopilot control interface of FIGS. 3 and 4, showing additional details of its structure.

FIG. 10 is a screen shot illustrating an embodiment of the appearance of a display in an autorecovery mode.

FIGS. 11 and 12 are screenshots illustrating the appearance of a display in a speed hold flight mode of the autopilot for purposes of changing track angle and/or speed.

FIGS. 13 and 14 are screenshots illustrating the appearance of a display in an altitude flight mode of the autopilot for purposes of changing track angle and/or altitude.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown, but is to be accorded the widest scope consistent with the principles and features described herein including modifications and equivalents. It is noted that the drawings may not be to scale and may be diagrammatic in nature in a way that is thought to best illustrate features of interest. Descriptive terminology may be adopted for purposes of enhancing the reader's understanding, with respect to the various views provided in the figures, and is in no way intended as being limiting.

Figure 1:
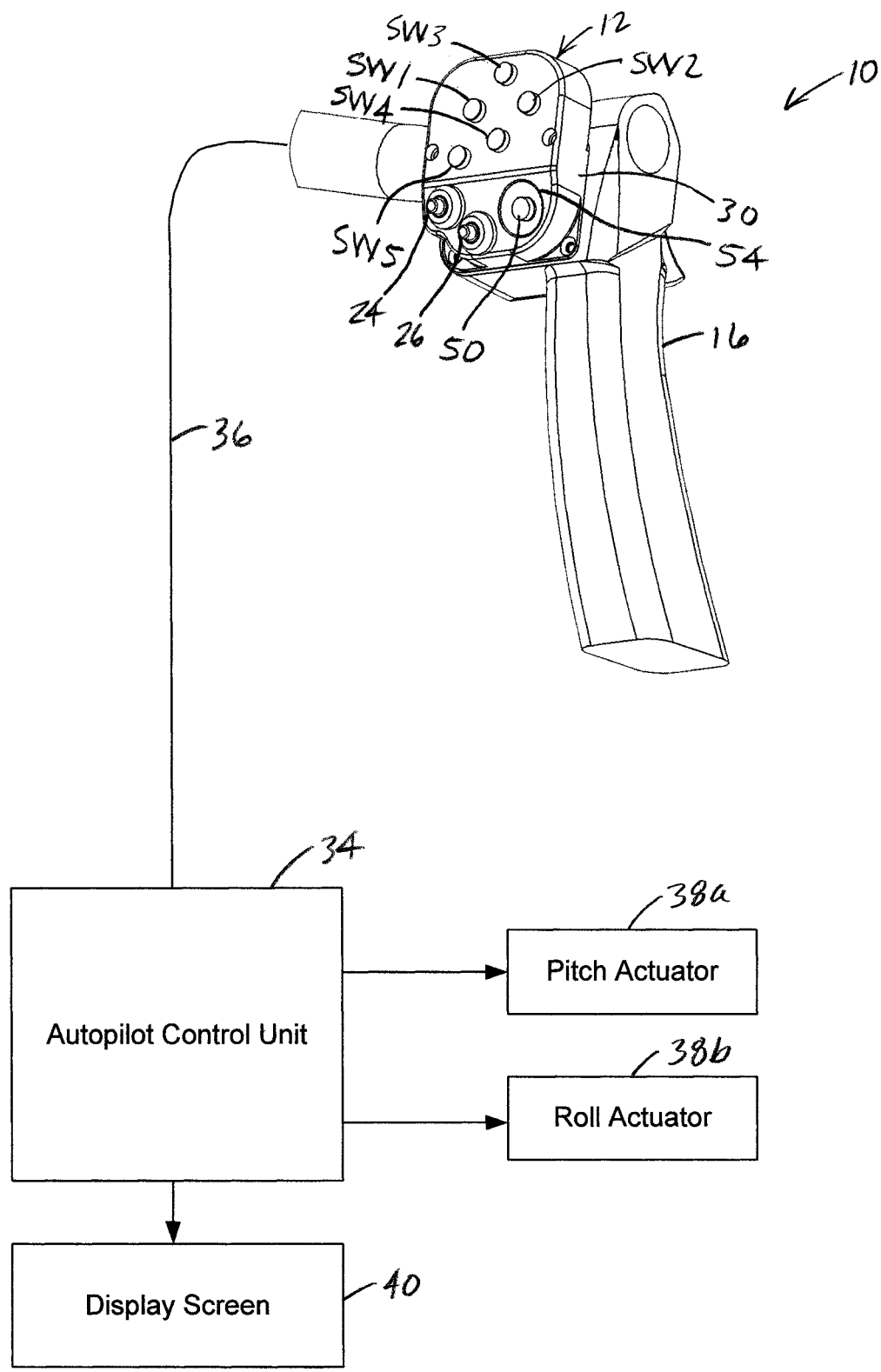
FIG. 1 is a hybrid view, partially in perspective and partially in the form of a block diagram, illustrating an embodiment of an autopilot system, including an embodiment of a pilot control interface in accordance with the present disclosure.

FIG. 1 is a diagrammatic view illustrating an embodiment of an autopilot system, generally indicated by the reference number 10. The autopilot system includes an embodiment of a pilot control interface 12 that can be mounted to a cyclic control or stick 16 of a helicopter. In the present example, the helicopter is a Robinson R22, although the pilot control interface and autopilot system can be used with any suitable aircraft and is not limited to helicopters. It is noted that the cyclic control is partially illustrated. As will be appreciated by one of ordinary skill in the art, stick 14 can be moved fore and aft (toward and away from an instrument console) to control pitch of the helicopter and transversely for purposes of controlling roll of the helicopter in a coordinated manner to produce controlled flight. Additional control inputs are provided by the pilot via a pair of pedals in order to control the yaw orientation of the helicopter by changing the pitch of a tail rotor. It is noted that these latter helicopter components have not been shown for purposes of illustrative clarity but are understood to be present. In an embodiment, the pilot also remains in control of the collective of the helicopter as well as the throttle settings. The autopilot of the present disclosure, however, can exert full control authority over stick 16 by moving the stick in any direction to the limits of its travel under appropriate circumstances. Stick 16 passes below a deck of the helicopter and engages pitch and roll linkages and actuators of the autopilot so as to control cyclic actuation of the main rotor of the helicopter. The term "cyclic" refers to the variation in pitch of the rotor blades of the helicopter on a per revolution basis. In this regard, cyclic control can refer to manipulation of the stick or the stick itself can be referred to as the cyclic. It should be appreciated that the teachings that have been brought to light herein remain applicable in the context of an autopilot that additionally controls one or more of throttle, collective and yaw.

In the Robinson R22, what can be referred to as a teetering or T-configured cyclic control or stick is used, however, the pilot control interface and autopilot system of the present disclosure can be used in conjunction with any configuration of aircraft control stick, either currently available or yet to be developed. While supporting the pilot control interface on the stick provides for convenient access by the pilot as well as benefits yet to be described, the pilot control interface can be panel mounted. Moreover, the concepts that are brought to light herein are submitted to be equally applicable in other fields of endeavor and are not limited to aircraft, suitable examples include but are not limited to video games, remote crane operation, fixed wing aircraft, military and commercial vehicles, boats, hovercraft and a computer cursor.

A housing 30 forms part of the pilot control interface and includes a plurality of buttons that interface with corresponding switches that are supported internal to the housing. The housing can be formed, for example, from a suitable plastic and/or metal using molding and/or machining. For purposes of convenience, each button and its associated switch may be referred to as a switch. Switches 24 and 26 are original equipment on the R22 and have been relocated to housing 30 which is itself mounted to cyclic control 16. Switches 24 and 26 allow the pilot to selectively change frequencies on a factory installed nav-com unit (not shown). Switch 24 changes the communications frequency while switch 26 changes the navigational frequency. Such a radio unit allows the pilot to program a new frequency into a stand-by channel for nay and com. By pressing the appropriate switch, the active and stand-by frequencies are interchanged. The pilot can then choose to reprogram the stand-by frequency or save the old frequency if he/she chooses to return to it. The pilot control interface is in electrical communication with an autopilot control unit 34 via an electrical interface 36. The set of flight modes that is available in the autopilot can include but is not limited to speed hold, altitude hold, hover, position hold and GPS Program. The autopilot control unit is itself in electrical communication at least with a pitch actuator 38a and a roll actuator 38b. The actuators can be housed below deck in the helicopter and interfaced to a lower end of the stick via suitable linkages. The autopilot control unit is interfaced with a display 40 that can be provided at any appropriate location that is visible to the pilot. The function of an autopilot control unit in association with actuators that are mechanically coupled to aircraft controls is well known. In the present example, a parallel control system is provided which leaves the original cyclic control linkages of the helicopter intact. A series type autopilot control system, in contrast, requires breaking the original cyclic control linkages of the helicopter between the stick and rotor such that the autopilot actuators can be inserted into the break. It should be appreciated that the teachings herein can readily be applied to a series control input embodiment. It is noted that an advanced autopilot control unit and associated actuators are described, for example, in U.S. patent application Ser. Nos. 13/763,574, 13/763,582 and 13/763,590 each of which is commonly owned with the present application and all of which are hereby incorporated by reference. The pilot control interface further includes a left switch SW1, a right switch SW2, a fore switch SW3 and an aft switch SW4 that are arranged in an intuitive manner on the face of the pilot control interface. Generally, each switch can include a normally open contact. In the present embodiment, a mode select switch SW5 serves as a selection switch and at least allows the pilot to switch between and control the flight modes of the autopilot. In another embodiment, what can be referred to as a top hat switch can be used to replace switches SW1-SW5, as will be described at an appropriate point hereinafter.

An engage/disengage selector 50 at least provides for highly reliable engagement and disengagement of the autopilot system by the pilot. In the present embodiment, the button associated with the engage/disengage selector can be received within a recess 54 on the face of the pilot control interface to protect from inadvertent actuations and to provide for tactile distinction of this important function. It is well-known that an inadvertent disengagement, in particular, of an autopilot might produce flight conditions that require the immediate attention of the pilot. Of course, any disengagement of the autopilot can be accompanied by aural, haptic and/or visual caution indications. As will be further described, pilot control interface 12 and engage/disengage selector 50, in particular, are configured to ensure a high degree of reliability in terms of electronic interpretation of the output state of the pilot control interface, for example, to provide enhanced noise immunity as well as reliable detection of potential failure modes.

Figure 2:
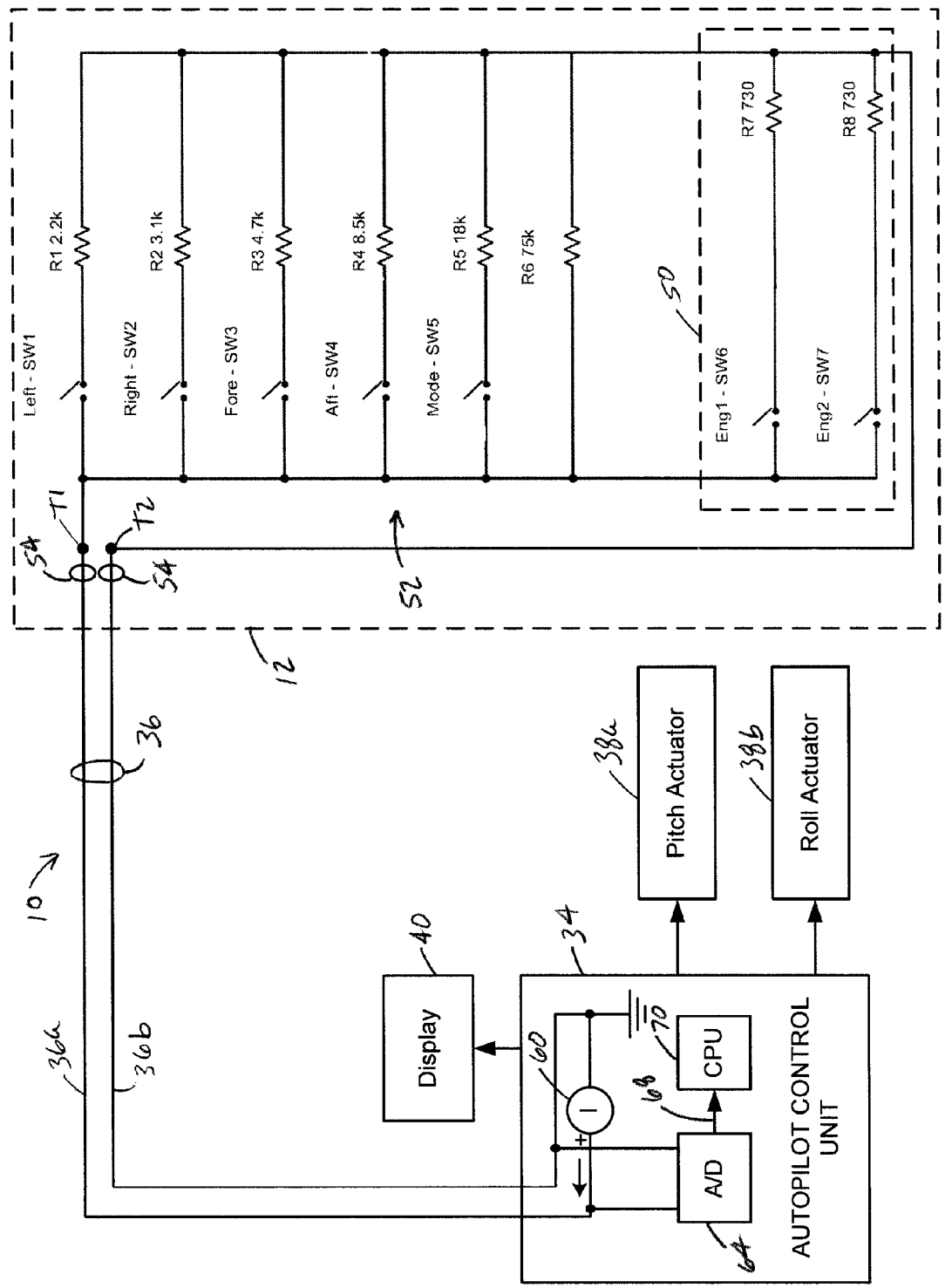
FIG. 2 is a schematic diagram illustrating details of an embodiment of the pilot control interface of FIG. 1 as well as its interface to an autopilot control unit of the autopilot system which is shown in block diagram form.

Attention is now directed to FIG. 2 in conjunction with FIG. 1. The former is a schematic diagram illustrating autopilot system 10 including an embodiment of pilot control interface 12. Switches SW1-SW5 are illustrated as part of a parallel resistance network 52 that is electrically connected across electrical interface 36. In particular, each switch is placed in series with one of resistors R1-R5, respectively, to form branches of the parallel resistance network. In the present embodiment, R1 is 2.2 K$\Omega$, R2 is 3.1 K$\Omega$, R3 is 4.7 K$\Omega$, R4 is 8.5 K$\Omega$ and R5 is 18 K$\Omega$. Of course, a tolerance is associated with each of these values. Any resistors used herein can be selected with an appropriate tolerance as well as other appropriate characteristics including, for example, thermal stability. Thus, R1-R5 with respective switches SW1-SW5 form five parallel branches. Another parallel branch includes resistor R6 which may be referred to as a null resistor. In the present embodiment, R6 has been selected as 75 K$\Omega$. It is noted that, in the present embodiment, R6 serves as the highest branch resistance value. Engage/disengage selector 50 is illustrated within a dashed rectangle. In an embodiment, the engage/disengage selector can comprise two parallel branches of the parallel resistance network wherein a first branch is made up of a switch SW6 and a resistor R7 and a second branch is made up of a switch SW7 and a resistor R8. Resistors R7 and R8 are of equal values in the present example, although this is not required, and can comprise the lowest resistance of any branch of the parallel network. As will be described in detail below, switches SW6 and SW7 are arranged such that a pilot actuation of the engage/disengage selector is intended to produce a simultaneous closure of switches SW6 and SW7 for purposes of redundancy and/or enhanced reliability. Thus, actuation of the engage/disengage selector normally produces a resistance contribution to the network that is equal to the parallel combination of R7 and R8. It is noted that any suitable type of switch or combination of switches can be utilized as SW1-SW7. One suitable switch is the readily available TL6200 series switch having a lifetime actuation rating of 10 million cycles, as well as allowing for the independent selection of actuator buttons having differing lengths. The actuator button includes a post that is received by the switch body using a snap fit. Details with respect to the selection of appropriate resistance values and operation of the circuitry will be provided at appropriate points hereinafter.

Referring to FIG. 2, electrical interface 36 is made up of two conductors 36a and 36b that are connected across the parallel network at terminations T1 and T2, and extend to autopilot control unit 34. It should be appreciated that only two electrical conductors are needed to make up interface 36, aside from shielding considerations. For enhanced immunity, one or both of the conductors can include a shield 54. In another embodiment, a twisted shielded pair can be used as interface 36. The latter can be grounded at the pilot control interface end and/or at the autopilot control unit end. In still another embodiment, a shielded coaxial cable can be used wherein the shield serves as one conductor connected to T2 and the central conductor serves as a signal lead connected to T1. In the present embodiment, the autopilot control unit drives interface 36 using a constant current source 60. An analog-to-digital (A/D) converter 64 is electrically connected across the sense resistor. An output 68 of the analog to digital converter is provided to a processor 70 for purposes of monitoring pilot actuations as well as monitoring the status of pilot control interface 12. In another embodiment, a constant voltage source can be used in series with a sense resistor $R_S$ to drive pilot control interface 12. In this case, A/D 64 can monitor the voltage across the sense resistor. The value of the sense resistor can be selected, for example, based on the minimum current that is reliably detectable by the A/D converter. In this regard, any suitable drive/monitoring arrangement can be employed in cooperation with the pilot control interface including constant current drive and/or constant voltage drive.

Having described pilot control interface 12 and associated monitoring arrangements in detail above, attention is now directed to details of its operation. Resistors R1-R8 are selected such that potential pilot actuations produce resistances that are unique across an allowed range of resistance. In the present embodiment, the allowed range of resistance is defined by the parallel combination of R7 and R8 of the engage/disengage selector as a lower limit and null resistor R6 as an upper limit. The allowed resistance range in the present example, therefore, is at least approximately 365$\Omega$ to 75 K$\Omega$, accounting for tolerances cabling resistance, connection resistance and the like. In this regard, the resistance values that are produced by actuation of any one of SW1-SW5 as well as actuation of engage/disengage selector 50, whether in normal operation or a partial failure condition, can be unique thereby producing readily distinguishable voltage values across analog-to-digital converter 64. Further, by spacing the allowed resistance states sufficiently apart, essentially the full resolution of analog-to-digital converter 64 can be utilized in this embodiment as well as another embodiment that is yet to be described such that many counts of the A/D are present between each state of the switching network. For example, the states can be spaced apart by at least three counts of the A/D. In this way, noise immunity can be enhanced for purposes of distinguishing between the allowed states. For example, a 10 bit analog-to-digital converter is capable of producing 1024 output states or counts. In the resistance network of FIG. 2, using seven independent switches, 128 states can at least potentially be produced. It is noted, however, that the number of states is reduced slightly due to the configuration of the engage/disengage selector having equal-valued resistors such that a total of 96 states can be produced. Accordingly, more than 10 counts can be present between each output state of the switching network for evenly spaced states. As will be further described, however, the spacing between states can be customized, for example, based on the criticality or importance of at least certain ones of the states. It is noted that combination switch actuations can be utilized in a selective manner as allowed states and/or ignored states. As will be further discussed, the minimum resistance, in the absence of any switch actuation, can be represented by null resistor R6 as an allowed state and an upper limit of the allowed resistance range. Table 1 presents a resistance value that is associated with a number of allowed states in the present embodiment.

TABLE 1

| Allowed State no. | Resistance | Reference no. | Function (Switch) |
|---|---|---|---|
| S1 | 365 Ω | R7//R8 | Engage/Disengage (SW6 and SW7) |
| S2 | 730 Ω | R7 or R8 | Engage/Disengage (SW6 or SW7) |
| S3 | 2.2 KΩ | R1 | Left (SW1) |
| S4 | 3.1 KΩ | R2 | Right (SW2) |
| S5 | 4.7 KΩ | R3 | Fore (SW3) |
| S6 | 8.5 KΩ | R4 | Aft (SW4) |
| S7 | 18 KΩ | R5 | Mode (SW5) |
| S8 | 75 KΩ | R6 (null resistor) | Open wire detection |

Referring to Table 1, it should be appreciated that state S1 represents a normal actuation of the engage/disengage selector while state S2 represents a partial failure thereof. In one failure mode, one of SW6 or SW7 fails open. An equivalent failure mode would be an open failure of one of R7 and R8. In another failure mode, one of SW6 and SW7 fails closed or shorted. The latter can be identified based on the detection of a long term presence of the S2 state on interface 36. In one embodiment, the failure of one of switches SW6 and SW7 in the engage/disengage selector can be regarded as noncritical such that the autopilot remains operational and signals the pilot of the noncritical failure. In another embodiment, this failure can be regarded as critical and the autopilot can notify the pilot to take over control. By way of non-limiting example, an open failure mode of one of these switches can be regarded as a noncritical failure, since this failure mode does not serve to mask other actuation states. As another example, a shorted failure mode of one of these switches can be regarded as a critical failure since such a failure mode can at least partially mask other, higher resistance actuation states. Because the resistance values for R7 and R8 in the engage/disengage selector are equal in the present embodiment, the autopilot system is unable to distinguish whether switch SW6 or SW7 has failed. In another embodiment, R7 and R8 can be of resistances that are sufficiently different such that the autopilot can distinguish between the failure of SW6 and SW7. In this case, an additional allowed state can be introduced. By way of non-limiting example in such an embodiment, R7 can be selected as 700Ω with R8 being selected as 800Ω States S3-S7 are associated with actuations of switches SW1-SW5, respectively. State S3 is spaced apart from state S1 by a factor of approximately six in resistance value to provide enhanced reliability and noise immunity with respect to distinguishing state S1 from actuations of SW1-SW5. On a state-to-state basis, state S1 can be spaced apart from the nearest allowed state during normal operation by a factor that is greater than the spacing between any other two adjacent states for enhancement of reliability and noise immunity. It is noted that the resistance values that are set forth in Table 1 are not intended as being limiting and any suitable set of values can be selected in light of the teachings herein. For example, values can be selected to represent binary combinations based on the series 1, 2, 4, 8, 16, 32, etc. In such an embodiment, the resistor values can be 1 Ω, 2 Ω, 4 Ω, 8 Ω, 16 Ω, 32 KΩ, etc. In this way, multiple switches can be actuated and the switches can be resolved based on the net binary value. For example, if switches associated with the values 8 Ω, 2 KΩ and 1 KΩ were simultaneously actuated, the detected value would be 11 KΩ such that the depressed switches are known since only one combination of switch actuations corresponds to 11 KΩ. The binary values can be represented by the current passing through each switch and the sensor, such as, for example an A/D converter can remotely sense the total current. In an embodiment, the circuit can be composed of resistors in series so that each switch can short out an associated resistance or replace an associated resistance with a value of at least approximately zero. Such an embodiment can use normally open or normally closed switches. In any case, the aggregate series resistance identifies the switches that were depressed.

While not required, by using the actuation of the engage/disengage selector to represent the lowest allowed resistance/state, it should be appreciated that no other actuation is able to mask this value. That is, analog-to-digital converter 64 is able to recognize state S1 even if one or more of switches S3-S7 is simultaneously actuated or shorted in a failure mode. For example, even if every switch (SW1 through SW5) is closed in combination with the engage/disengage selector, a resistance of approximately 255Ω is produced. In an embodiment, this latter resistance or some other suitable combination of actuation-based resistances can be used as a lower limit of the allowed resistance range. Detected voltages that are associated with resistance values that are lower than the lower limit can be interpreted by CPU 70 as being indicative of a short in interface 36. Responsive to detection of a shorted condition, an indication can be provided to urge the pilot to take over control of the aircraft, if the autopilot is active.

Turning now to FIG. 3, a partially exploded view, in perspective, of autopilot control interface 12 is shown for purposes of illustrating the details of an embodiment of its internal structure. Housing 30 is configured to receive a main printed circuit board 300 which supports and electrically interfaces switches SW1-SW5 for alignment with cooperating openings that are defined in a faceplate of the housing. The housing is also configured to support nav-com switches 24 and 26. Switches SW6 and SW7 of engage/disengage selector 50 are supported and electrically interfaced by an engage/disengage selector printed circuit board 304. In an embodiment, board 304 includes a circular periphery, although any suitable shape can be used. Switches S6 and S7 are supported on opposing sides of board 304 in a back-to-back configuration, sandwiching the board therebetween.

Referring to FIG. 4 in conjunction with FIG. 3, the former is a rear view, in perspective, taken from behind autopilot control interface 12. As shown, resistors R1-R8 can be supported and electrically interfaced on a rear surface of main printed circuit board 300. The particular physical arrangement of these resistors has been provided by way of example only, and is not intended as being limiting. For instance, at least some of the resistors can be located on the opposing, forward facing surface of printed circuit board 300. In another embodiment, resistors R6 and R7 can be located on printed circuit board 304 of the engage/disengage selector. A connector 308 can be provided as a terminus of the autopilot control interface, forming one end of electrical interface 36, as is partially and diagrammatically illustrated for electrical connection to autopilot control unit 34 or any suitable component.

Attention is now directed to FIGS. 3-5 wherein FIG. 5 is a rear diagrammatic view, in perspective of pilot control interface 12. As seen in FIG. 5, engage/disengage selector 50 can be captured in an installed position using a bracket 310 that is held in place, for example, using fasteners 312. The bracket can be formed, for example, by from a suitable plastic and/or metal using machining and/or molding. When so positioned, a post 328 (FIG. 3), that is supported by bracket 310, can be received within a central opening 330 (FIG. 4) of the switch body of SW7 such that post 328 serves as an actuator button for this switch in a manner that is yet to be described. The post can be integrally formed with the bracket or separately formed, for example, from a suitable plastic or metal and installed on the bracket, for instance, using threaded engagement, an interference fit or other suitable expedient. An opposing, forward end of selector 50 can be captured in position using a peripheral surface 334 of SW7 (FIG. 4) received against an interior surface 324 of housing 30 (FIG. 5). It should be appreciated that engage/disengage selector 50 is received for movement along an actuation direction 344 within housing 30 responsive to pilot actuations of an engage/disengage button 340 which serves as an actuator for SW6. That is, depression of button 308 serves to compress the engage/disengage selector between the button and bracket 310 along actuation direction 344 such that SW6 and SW7 are essentially simultaneously closed. Based upon this floating installation of the engage/disengage selector, a set of flexible conductors 350 extends from main printed circuit board 300 to board 304. For purposes of further enhanced reliability, the flexible conductors can initially be routed through strain relief openings and electrically connected to contacts 354 (FIG. 3) on an opposite side of board 304.

Figure 6:
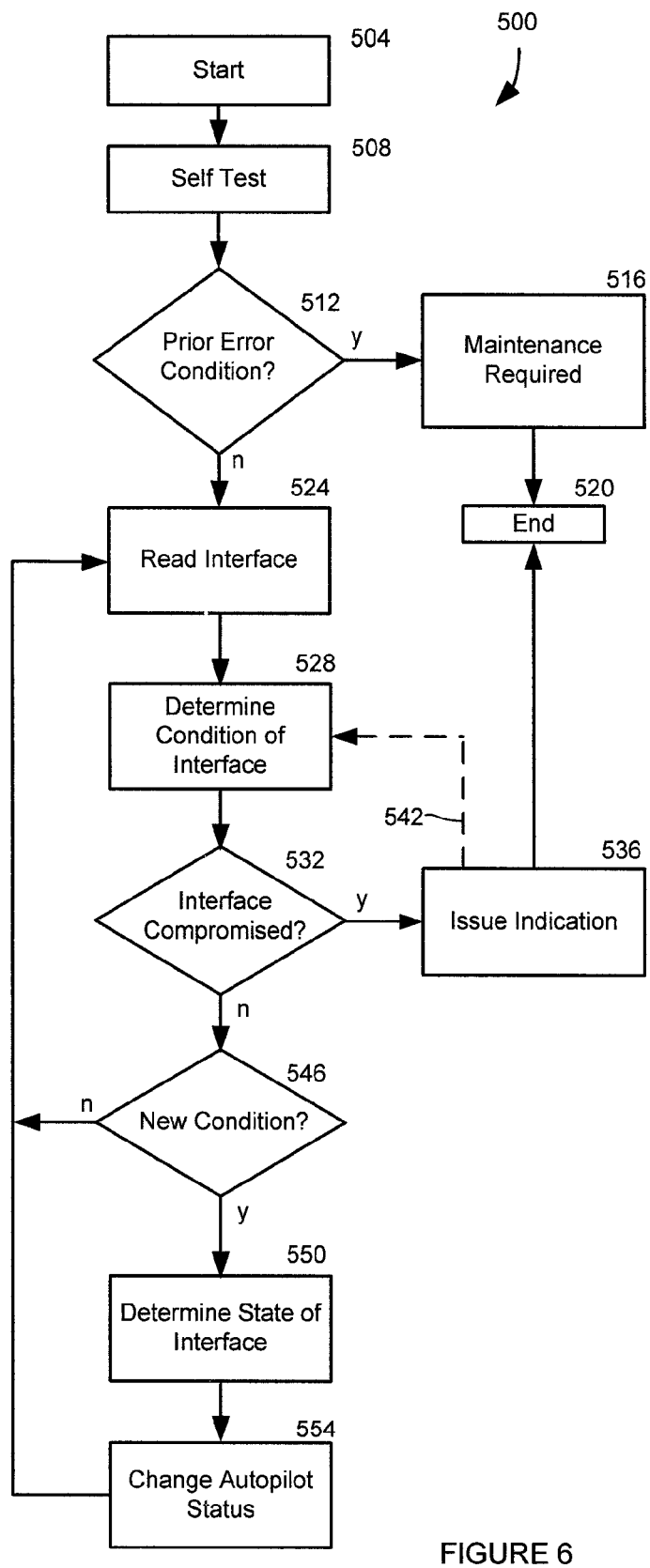
FIG. 6 is a flow diagram illustrating an embodiment for a method of operation of the autopilot system in cooperation with the pilot control interface of the present disclosure.

Attention is now directed to FIG. 6 which is a flow diagram that illustrates an embodiment of a method for the operation of autopilot system 10, generally indicated by the reference number 500, in conjunction with pilot control interface 12. The method begins at start 504 and proceeds to 508 which can perform a startup self-test. Responsive to the results of the startup self-test, at 512, it is determined whether any unresolved errors or anomalies were identified prior to the last shutdown of the autopilot system. If any unresolved errors or anomalies were detected, operation is routed to 516 which can provide an indication that maintenance is required prior to further operation of the autopilot system. The indication can be provided, for example, on a display panel of the autopilot system and may be accompanied by an aural indication and/or illumination of a caution light. Operation then ends at 520. If no prior error condition is detected at 512, operation proceeds to 524 which reads interface 36 in a normal operation mode. At 528 the operational condition of the interface is determined. The latter determination can be determined in any suitable manner. For example, the current operational condition of the interface can be identified in terms of a detected voltage that can be compared to an allowed voltage range that corresponds to the previously described allowed resistance range. At 528, the current condition of the interface is established. For example, it can be determined that the interface has been compromised based on the detected voltage being out of the allowed voltage range. If the detected voltage is below the allowed voltage range, the interface may be subject to a short circuit failure. On the other hand, if the detected voltage is higher than the allowed voltage, the interface may be subject to an open circuit failure. As another example, it can be determined that the interface has been compromised based on a failure of one of switches SW6 and SW7 in a manner that is consistent with the descriptions above. As still another example, a stuck (i.e., shorted) switch can be identified based on an analysis over time which indicates that a particular switch reads as if it is in a closed or actuated for an excessive period of time. This latter analysis can be applied over a number of iterations through steps 524 and 528. At 532, if the condition of the interface is determined to be compromised, operation is routed to 536 which takes appropriate action based on the nature of the compromise such as, for example, issuing an indication to the pilot in any appropriate form or form(s). In some embodiments, operation can then be ended at 520, for example, once the pilot takes over control. In other embodiments, the compromise can be considered as non-critical and normal operation can continue by routing operation back to step 524, as indicated by a dashed arrow 542. One example of a non-critical error can be regarded as a failure of one of switches SW6 or SW7 of the engage/disengage selector. If 532 determines that pilot control interface operation is normal, the method branches to 546 which determines whether the determined condition represents a change in the status of the interface. If not, operation is routed back to step 524. If the determined condition has changed, operation is routed to 550 which determines the current state of the interface, for example, based on the states of Table 1. At 554, the status of the autopilot is changed based on the determined state. For example, the autopilot may be engaged or disengaged. As another example, the flight mode can be changed. As still another example, a characteristic of a current flight mode can be modified. Operation then returns to step 524.

Figure 7:
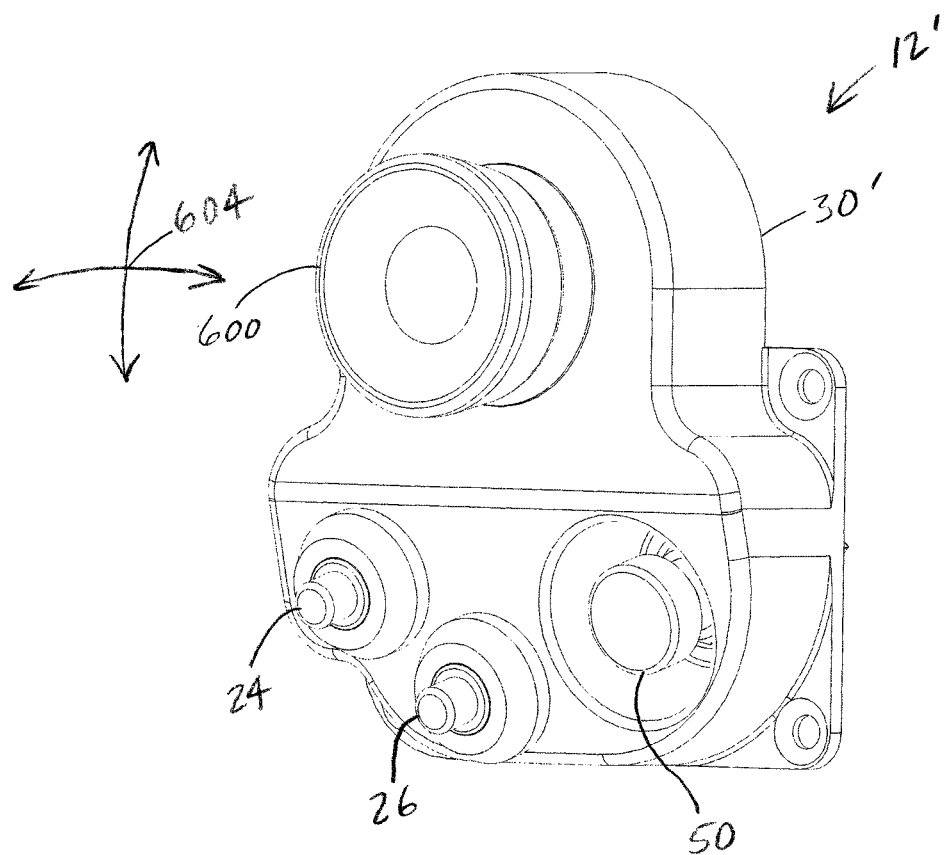
FIG. 7 is a diagrammatic view, in perspective, illustrating another embodiment of the pilot control interface of the present disclosure.

Attention is now directed to FIG. 7 which is a diagrammatic view, in perspective, illustrating another embodiment of the pilot control interface of the present disclosure, generally indicated by the reference number 12'. The present embodiment includes a housing 30' which supports a top hat switch 600. The latter includes four switches that are arranged in the manner of switches SW1-SW4 of FIG. 4. Each of these switches can be individually actuated responsive to appropriate movements of the top hat as illustrated by double-headed arrows 604. Schematically, interface 12' can be represented by the schematic of FIG. 2 with the exception that mode select switch SW5 may not be needed for the reason that depressing the top hat at least generally along its axis of symmetry simultaneously actuates all of switches SW1-SW4. This actuation can be interpreted as a mode select actuation. By way of non-limiting example, the resistance values can be selected based on a binary series, as described above.

Figure 8:
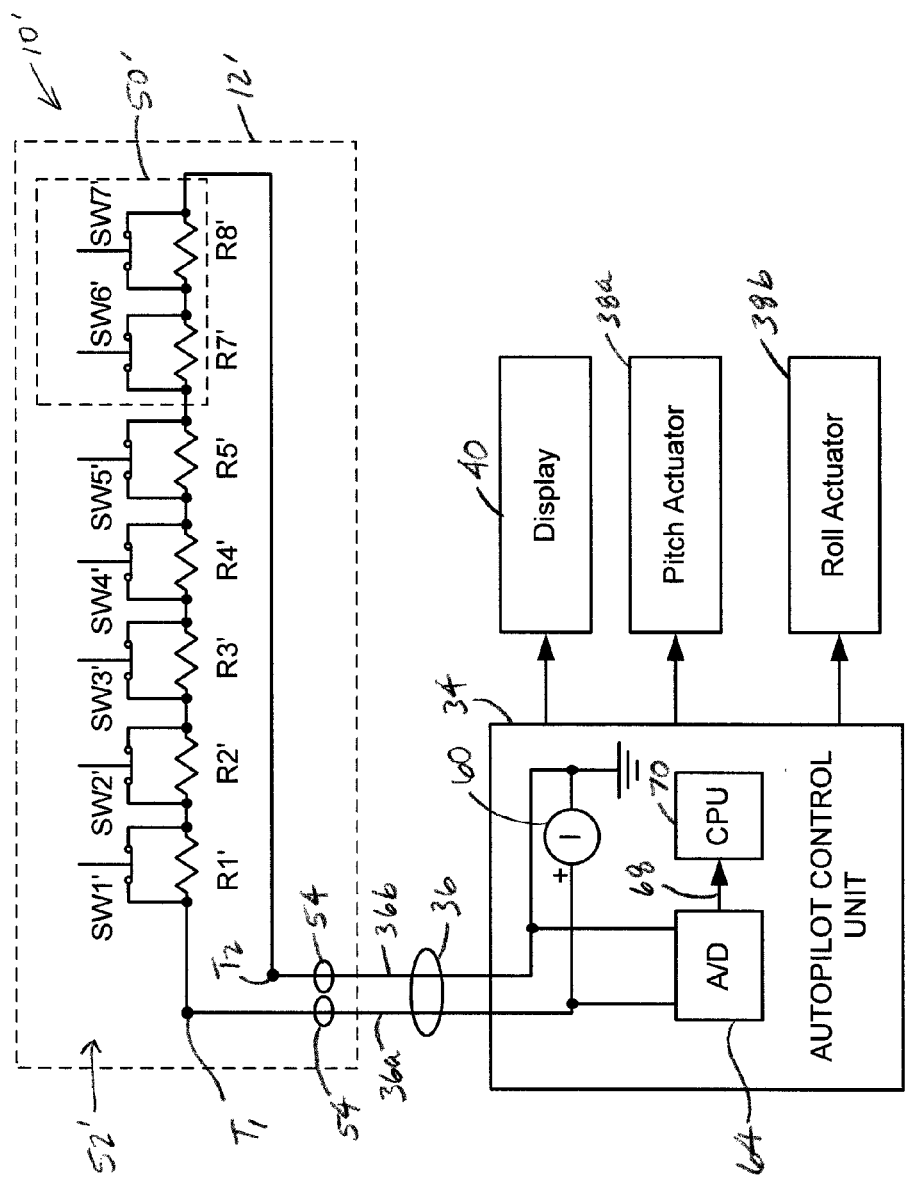
FIG. 8 is a schematic diagram illustrating details of another embodiment of the pilot control interface of FIG. 1 as well as its interface to the autopilot control unit of the autopilot system which is shown in block diagram form.

Attention is now directed to FIG. 8 which is a schematic diagram illustrating another embodiment of the autopilot system of the present disclosure, generally indicated by the reference number 10'. The present embodiment includes an embodiment 12' of the pilot control interface. It is noted that descriptions of like components may not be repeated for purposes of brevity. Switches SW1'-SW7' are illustrated as part of a series resistance network 52' that is electrically connected across electrical interface 36. It is noted that any suitable type of switch can be utilized as SW1'-SW7' such as, for example, the TL6200 series switch. Each switch continues to serve the same function as the corresponding switch in FIG. 2, however, the switches are normally closed and, therefore, open responsive to a pilot actuation. Further, each of switches SW1'-SW5' is placed in parallel with one of resistors R1'-R5', respectively, while switch SW6' is in parallel with resistor R7' and switch SW7' is in parallel with R8'. In the present embodiment, R1' is 1 K$\Omega$, R2' is 2 K$\Omega$, R3' is 4 K$\Omega$, R4' is 8 K$\Omega$, R5' is 16 K$\Omega$, R7' is 32 K$\Omega$ and R8' is 64 K$\Omega$. Of course, a tolerance is associated with each of these values. As noted above, any resistors used herein can be selected with an appropriate tolerance as well as other appropriate characteristics including, for example, thermal stability. Engage/disengage selector 50' is illustrated within a dashed rectangle and, in the present embodiment, includes switches SW6' and SW7' along with resistors R7' and R8'. Other than the use of normally closed switches and modified electrical connections, the mechanical configuration of the engage/disengage selector is unchanged, as illustrated in FIGS. 3-5, such that both switches are actuated essentially simultaneously responsive to the pilot under normal circumstances.

In the absence of a pilot actuation during normal operation, engage/disengage selector 50' presents a resistance of at least approximately zero ohms to interface 36. Thus, at least approximately zero volts is detectable at interface 36 in the absence of a pilot interaction. For any switch that is actuated or depressed by the pilot, the value of the associated resistor for that switch is added as a contribution to the resistance value that is presented at interface 36. If multiple switches are actuated, the resistance that is presented at interface 36 is the sum of the resistor values for the actuated switches. For example, switches SW6' and SW7' are arranged such that a pilot actuation of the engage/disengage selector is intended to produce a simultaneous opening of switches SW6' and SW7' for purposes of redundancy and/or enhanced reliability. Thus, actuation of the engage/disengage selector normally produces a resistance contribution to the network that is equal to the series combination of R7' and R8' which is 96 KΩ in the present embodiment. As another example, a maximum actuation resistance of 127 KΩ corresponds to a simultaneous actuation, however unlikely, of every switch SW1'-SW7'. As the resistance that is presented at interface 36 increases, the voltage that is detectable at the interface increases correspondingly since current source I is a constant current source. In the event of a broken wire condition (i.e., one or both of wires 36a and 36b is broken), the resistance that is presented at the interface approaches infinity. In this case, the voltage that is detectable at interface 36 is the maximum voltage that the constant current source is capable of delivering. Accordingly, detection of the maximum voltage is indicative of a broken wire condition. Thus, an actuation of any one of the switches produces a resistance value across the two conductors that falls within a range of valid resistance values corresponding to valid states such that detected resistance values across the two conductors and above the range can be indicative of a broken wire condition. An error or failure condition for engage/disengage selector 50' is associated with detecting a voltage at interface 36 that corresponds to the resistance values of R7' (32 KΩ) or R8' (64 KΩ). Detection of values indicative of a problem with the engage/disengage selector can be handled in a manner that is consistent with the descriptions above. Further, detection of any voltage that corresponds to a resistance in a range from 96 KΩ(R7'+R8') to 127 KΩ can be regarded as an engage/disengage selector actuation that is representative of a simultaneous actuation of at least one other switch along with the engage/disengage selector. In another embodiment, this range can extend from 32 KΩ(R7') to 127 KΩ. Based on the selection of R7' and R8' as high resistance values for the resistance network in conjunction with these latter ranges, masking of an engage/disengage selector actuation due to the inadvertent actuation of one or more additional switches is avoided. Detection of a voltage that corresponds to a resistance that is greater than 127 KΩ or a selected higher threshold value such as, for example, greater than 150 KΩ can be regarded as an open wire condition, resulting in appropriate action such as, for example, pilot notification. Accordingly, it should be appreciated that embodiment 12' of the pilot control interface provides benefits that correspond to those of embodiment 12, as described above. In another embodiment, a constant voltage source can be used in series with a sense resistor $R_S$ to drive pilot control interface 12'. In this case, A/D 64 can monitor the voltage across the sense resistor.

Having described embodiments of the pilot control interface above utilizing a switched resistance network, it should be appreciated that other embodiments can utilize a switched capacitor network, a switched inductor network, a switched inductor/capacitor (L/C) network or a switched inductor/capacitor/resistor (LCR) network. These network types can be driven by an alternating current (a.c.) supply. By way of non-limiting example, inductor and/or capacitor a.c. impedances can be spaced apart in essentially the same manners as those associated with resistors. Thus, any suitable arrangement of passive components can be utilized. With this disclosure in hand, it is submitted that one of ordinary skill in the art can readily implement such networks utilizing an alternating current drive. In this regard, it should be appreciated that a parallel connection of inductors behaves in an analogous manner to a parallel connection of resistors (product over sum) while a parallel connection of capacitors behaves in an analogous manner (i.e., additive) to a series connection of resistors.

Embodiments of the control interface of the present disclosure provide benefits in terms of high reliability, accuracy and noise immunity with respect to distinguishing the various switched actuation states. Further, selected states such as, for example, a critical state or function, as exemplified by the engage/disengage selector described above, can be handled in the switched network in a way that provides even further enhanced reliability and/or accuracy with respect to what can be considered as a critical output state or function. Another benefit resides in the need for only two electrical conductors in the interface leading to the switched network. It should be appreciated, for example, that separate power leads are not needed. Thus, concerns with respect to constrained physical space for purposes of routing electrical connections are reduced to essentially a minimum. It is submitted that conventional aircraft electrical interconnections typically specify at least one dedicated electrical conductor for each switch. In some cases, the installation of a cable containing such a required number of conductors in a pre-existing structure such as, for example, a helicopter cyclic can be difficult, at the least. As discussed above, the control interface of the present application is not limited to the field of aircraft controls. In this regard, it is submitted that one of ordinary skill in the art can readily adapt the disclosed control interface to a wide range of other fields of endeavor having this overall disclosure in hand. It is considered that such adaptation falls within the scope of the present application so long as the teachings that have been brought to light herein are applied.

Figure 9:
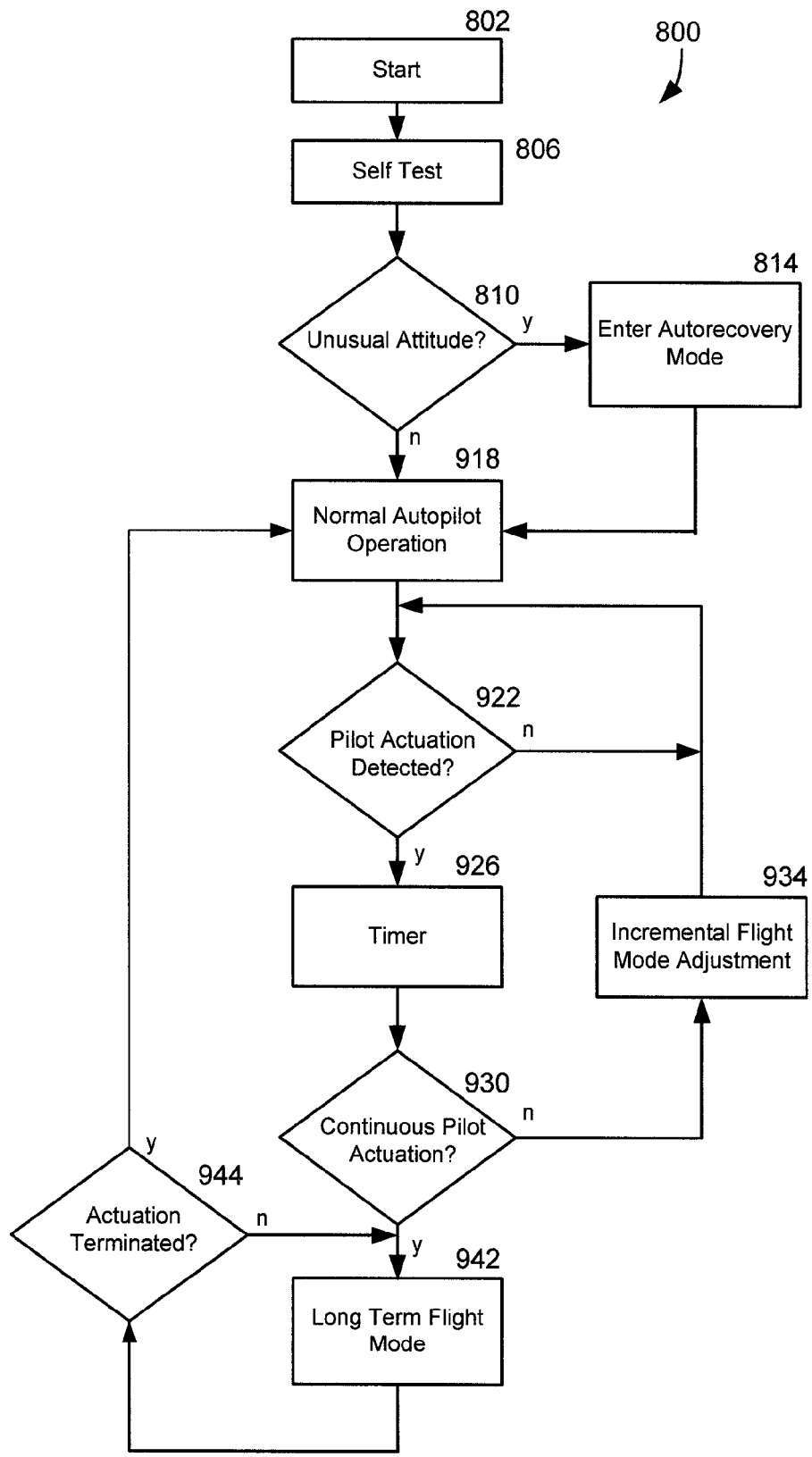
FIG. 9 is a flow diagram illustrating an embodiment of a method for managing rotorcraft flight in accordance with the present disclosure.

Referring to FIG. 9, a method for managing rotorcraft flight is generally indicated by the reference number 800. A suitable set of flight modes is described in U.S. Published Patent Application No. 2014-0027565 A1, U.S. application Ser. No. 13/763,582, which is commonly owned with the present application and hereby incorporated by reference. While the method and associated apparatus described herein can be used with embodiments of the pilot control interface disclosed herein, it should be appreciated that this is not a requirement and the teachings herein can readily be adapted to any suitable interface. The method begins at start 802, for example, when the autopilot is activated and proceeds to a self test 806. Certain autopilot modes can be automatically activated. For example, an attitude recovery mode can be initiated responsive to engaging the autopilot. This automatic response can be based on the attitude at the time of engagement. If the helicopter is found to be in an unusual attitude at the time of engagement, the autopilot brings the helicopter to straight and level flight. An artificial horizon can be displayed in conjunction with the attitude recovery mode, as described above. Accordingly, at 810, the autopilot tests for the presence of an unusual attitude. The parameters for detection of an unusual attitude can be based, for example, on pitch or roll angle. If an unusual attitude is detected, operation proceeds to 814 which initiates an autorecovery mode that restores the helicopter to straight and level flight. FIG. 10 is a screen shot of display 40 illustrating an embodiment of the appearance of the display in the Autorecovery mode. It is noted that each of the flight mode displays described herein can include a navigation portion having a heading bar 820 including a centerline 824 that indicates the current heading of the helicopter. In an embodiment, the heading bar can be generated based on the output of a slaved gyro. Below heading bar 820, a track indicator 828 and a heading indicator 830 can be provided. Track indicates the angle that the helicopter is moving over the ground and differs from the heading which is the angle the helicopter is pointing, usually referenced to magnetic north. It is noted that the heading can vary with respect to the course or track indication responsive to crosswinds. In the present example, heading bar 820 as well as heading 830 show a heading, HDG, of 298 degrees while track indicator 828 shows a track, TRK, of 295 degrees. For purposes of the autorecovery mode, an autorecovery indication 832 can be provided.

Referring again to FIG. 9, subsequent to autorecovery, normal autopilot operation can proceed at 918. On the other hand, if an unusual attitude is not detected at 810, normal operation can thereafter be directly entered at 918. Generally, the autopilot will enter either a speed hold mode or an altitude hold mode based on the current speed of the aircraft. On the front side of the power curve (above 55 kts, by way of example, for an R22), the altitude hold mode is entered, however, at speeds approaching a maximum speed for the aircraft (102 kts for the R22), the speed hold mode is entered. On the back side of the power curve (below 55 kts for the R22), the speed hold mode is entered. At 922, the pilot control interface is continuously monitored for a pilot actuation of any button/switch. Responsive to an actuation, operation proceeds to 926 which initiates a timer. The time-out value for the timer can be selected as any suitable value such as, for example, one-half second. Suitable values can be in the range from 0.1 to 1.0 seconds. At 930, the autopilot determines whether the actuation initially detected at 922 remains present following the time-out. If the actuation is no longer present, the actuation is determined to be momentary and operation proceeds to 934 which performs an incremental adjustment of the current flight mode of the autopilot and causes an indication to be presented on display 40. For example, in the speed hold mode, a momentary actuation of left switch SW1 or right switch SW2 (FIGS. 1 and 2) results in an incremental change in the track angle of the aircraft. FIG. 11 is a screenshot of display 40 which illustrates an embodiment of the appearance of the display at the time that the autopilot responds to the actuation. In this example, left SW1 has been momentarily actuated, accompanied by the temporary appearance of an arrow 938. The arrow can be displayed, for example, for the duration of time that is needed by the autopilot to complete the adjustment of the track angle. Of course, track indicator 828 and heading 830 will change responsive to the track angle adjustment. Such a momentary actuation can result in an angular change in the track angle of a predetermined amount such as, for example, 5 degrees, although any suitable value can be used. If step 930 detects that the actuation is long term (i.e., continuous) or ongoing, a long term or continuous flight mode adjustment is made at 942. In the example of a continuous actuation of left switch, SW1, the autopilot executes a continuous turn to the left. The turn is maintained until step 944 detects that the actuation has ended. In an embodiment, continuous or long term turns executed by the autopilot can be performed as standard rate turns for the given aircraft in which the autopilot is installed. For example, a standard rate turn for the Robinson R22 is 2 minutes for 360 degrees. Display 40 of FIG. 11 can respond in any suitable manner such as, for example, by maintaining arrow 938 throughout the turn. Once the actuation ends, as detected at 944, the turn ends and the current flight mode resumes on the new track with the method branching to normal operation 918.

Referring to FIG. 11, it should be appreciated that an incremental or continuous turn to the right can be performed in a manner that is consistent with the descriptions above and with the presentation of an arrow on an opposing side of display 40 pointing to the right in the view of the figure. In the speed hold mode, actuations of fore switch SW3 and aft switch SW4 (FIGS. 1 and 2) can produce an acceleration or deceleration to a new speed. For a momentary actuation, a suitable incremental change in the speed can be produced by step 934 of FIG. 9 such as, for example, 5 knots, although any suitable incremental amount of change can be used. For a continuous actuation, the speed can be continuously increased or decreased, for example, at a rate of 1 knot per second, by step 942 of FIG. 9. The current speed can then be maintained as the current speed which is indicated at the end of the actuation. An active speed change can be indicated, by way of non-limiting example, using arrows 950 as seen in the screen shot of FIG. 12 wherein upward pointing arrows represent a speed increase and downward pointing arrows represent a speed decrease. A textual indication 952 such as, for example, ACCEL or DECEL can be provided with or without arrows 950. The presentation of these arrows and/or the textual indication can be maintained, for example, for the duration of the actuation. It is noted that FIG. 12 illustrates an increase in speed from 56 knots to 61 knots as part of a continuous and ongoing increase in speed.

FIG. 13 is a screenshot of display 40 which illustrates an embodiment of the appearance of an embodiment of the display during the altitude hold mode at the time that the autopilot responds to the actuation of right switch SW2. The response to detection of the actuation can be an arrow 954 pointing to the right. In the altitude hold mode, the autopilot can respond to actuations of SW1 and SW2 in a manner that is essentially identical to the responses described above in the speed hold mode. Of course, an actuation of left switch SW1 can present arrow 938 of FIG. 11, as opposed to arrow 954.

Turning to FIG. 14, another screenshot 40 illustrates an embodiment of the appearance of display 40 during the altitude hold mode responsive to an actuation of fore switch SW3. The detection of a momentary actuation of either SW3 or SW4 by method 800 can produce an incremental change in altitude. By way of non-limiting example, the incremental change can be 25 feet. In this regard, any suitable value can be used. Based on the detection of a long term actuation of SW3 or SW4, the autopilot can initiate a climb or descent, respectively, for the duration of the actuation. Upon detection of the absence of the actuation, method 800 can return to normal operation in the altitude hold mode at the new altitude. Responsive to the actuation of SW3, arrows 950 can appear on the display which can be accompanied by a textual indication 958. The arrows and/or textual indication can persist based on the duration of the actuation. The textual indication, in the present example, indicates CLIMB or some other suitable term. In the instance of the actuation of SW4, the textual indication can comprise DESCEND or some other suitable term and arrows 950 can point downward in the view of the figure. It is noted that FIG. 14 illustrates a climb from 1100 feet to 1125 feet as part of a continuous and ongoing climb responsive to a long term actuation of SW3. In an embodiment, a continuous climb or descent can be performed at a rate such as, for example, 500 feet per minute which serves as a standard rate for the Robinson R22. In this regard, the rate can be customized based on the given helicopter in which the autopilot is installed.

In view of the foregoing, it should be appreciated that the autopilot of the present application represents a significant advancement in terms of safety. For example, if a pilot were to inadvertently fly into a cloud and become disoriented, engagement of the autopilot will restore the aircraft to straight and level flight. Thereafter, the pilot can hold either left button SW1 or right button SW2 to execute a turn, for example, of 180 degrees and then fly forward out of the cloud in an appropriate flight mode.

The foregoing description of the invention has been presented for purposes of illustration and description. It is not intended to be exhaustive or to limit the invention to the precise form or forms disclosed, and other modifications and variations may be possible in light of the above teachings wherein those of skill in the art will recognize certain modifications, permutations, additions and sub-combinations thereof.

What is claimed is:

1. A pilot control interface for selective control of an autopilot system by a pilot of an aircraft in which the autopilot system is installed, the aircraft including a control stick operable to manually control the flight of the aircraft and the autopilot system mechanically coupled to the control stick and including an autopilot control unit, said pilot control interface comprising:
   an electrical resistance network that is selectively switchable between a plurality of states; and
   a plurality of switches mounted to the control stick for pilot interaction therewith to selectively switch said electrical resistance network between said states such that each state exhibits an output resistance across an output interface that is made up of no more than two conductors
   wherein said autopilot control unit is mounted separate from the control stick and the electrical resistance network is connected to the autopilot control unit by said output interface.

2. The pilot control interface of claim 1 wherein said aircraft is a helicopter including a cyclic control serving as the control stick and wherein said electrical resistance network and said plurality of switches are supported on said cyclic control.

3. The pilot control interface of claim 1 wherein said switches at least include a fore switch, an aft switch, a left switch, a right switch, and at least one engage/disengage switch.

4. The pilot control interface of claim 3 wherein the plurality of switches is configured for simultaneous actuation of the fore switch, the aft switch, the left switch and the right switch for detection as a mode select actuation.

5. The pilot control interface of claim 3 wherein said switches further comprise:
   a mode select switch at least for selection of a flight control mode of the autopilot.

6. The pilot control interface of claim 5 wherein actuation of any one of the switches produces a unique electrical resistance across the two conductors of the pilot control interface.

7. The pilot control interface of claim 6 wherein the switches are normally open switches and the electrical resistance network is a parallel resistance network that includes a null resistor having a finite value that is connected across said two conductors for external detection of a broken wire condition.

8. The pilot control interface of claim 6 wherein the switches are normally open switches and the electrical resistance network is a parallel resistance network with an actuation of any one of the switches producing a resistance value across the two conductors that falls within a range of valid resistance values corresponding to said states such that detected resistance values across the two conductors and above said range are indicative of a broken wire condition and detected resistance values that are below said range are indicative of a shorted condition.

9. The pilot control interface of claim 8 wherein the electrical resistance network includes a null resistor having a finite value that is connected across said two conductors for defining an upper limit of said range and actuation of said engage/disengage switch defines a lower limit of said range.

10. The pilot control interface of claim 9 wherein the lower limit of said range is spaced away from a nearest allowed resistance value that is associated with a pilot actuation of any other one of the switches by a factor of at least six.

11. The pilot control interface of claim 9 wherein the states are sensed by an analog to digital converter that exhibits a given number of counts and a first resistance state associated with the fore switch, a second resistance state associated with the aft switch, a third resistance state associated with the left switch, a fourth resistance state associated with the right switch and a fifth resistance state associated with the mode select switch are spaced apart in resistance by at least three A/D counts within said range.

12. The pilot control interface of claim 1 further comprising:
   an engage/disengage selector that includes first and second resistors forming part of the electrical resistance network and first and second switches associated with the first and second resistors, respectively, such that a pilot actuation of the engage/disengage selector, during normal operation, changes a state of the first and second switches to electrically connect the first and second resistors to said two conductors to present an engage/disengage resistance across the two conductors.

13. The pilot control interface of claim 12 wherein the electrical resistance network is a parallel network, and the first resistor and the second resistor are at least approximately equal in resistance such that a failure of one or the other of the first and second switches is detectable based on detecting a resistance value across the two conductors that is at least approximately equal to twice the engage/disengage resistance.

14. The pilot control interface of claim 12 wherein said engage/disengage selector includes a printed circuit board including a first major surface supporting the first switch and a second major, opposing surface supporting the second switch in electrical communication with the first and second resistors, respectively, such that the first switch and the second switch are supported in a back-to-back configuration.

15. The pilot control interface of claim 14 wherein the first switch defines a first actuation direction and the second switch defines a second actuation direction and wherein the printed circuit board supports the first switch and the second switch such that the first actuation direction and the second actuation direction are at least generally coextensive and the printed circuit board is supported for movement along an actuation axis that is at least generally aligned with the first actuation direction and the second actuation direction such that a pilot interaction produces a movement of the engage/disengage selector along the actuation axis as part of changing the state of the first switch and the second switch.

16. The pilot control interface of claim 15 further comprising:
   an engage/disengage button for receiving the pilot interaction to move the engage/disengage selector along the actuation axis in a way that compresses the engage/ disengage selector to change a state of each of the first switch and the second switch.

17. The pilot control interface of claim 16 further comprising:
a support for retaining the engage/disengage selector, said support including an actuator pin that is received by the second switch for at least generally maintaining an alignment of the engage/disengage selector along the actuation axis such that the engage/disengage selector is captured for compression between the engage/disengage button and the support.

18. The pilot control interface of claim 12 wherein the first resistor and the second resistor are of different first and second resistance values, respectively, such that a first failure of the first switch is identifiable based on detecting the first resistance value across the two conductors and a second failure of the second switch is identifiable based on detecting the second resistance value across the two conductors at any given time.

19. A pilot control interface for selective control of an autopilot system by a pilot of an aircraft in which the autopilot system is installed, the aircraft including a control stick operable to manually control the flight of the aircraft and the autopilot system mechanically coupled to the control stick and including an autopilot control unit, said pilot control interface comprising:
a network of passive electrical components that is selectively switchable between a plurality of states responsive to pilot interaction with a plurality of switches mounted to said control stick such that each state exhibits an output characteristic across an output interface that is made up of no more than two conductors
wherein said autopilot control unit is mounted separate from the control stick and said network of passive electrical components is connected to the autopilot control unit by said output interface.

20. The pilot control interface of claim 19 wherein said network is made up of a selected one of inductors, capacitors and resistors.

21. The pilot control interface of claim 19 wherein said network is made up of a combination of passive components selected from the group of inductors, capacitors and resistors.

22. An autopilot system for selective control of an aircraft, the aircraft including a control stick operable to manually control the flight of the aircraft and the autopilot system mechanically coupled to the control stick and including an autopilot control unit, said autopilot system comprising:
one or more actuators in control communication with one or more flight controls of the aircraft;
an autopilot controller in electrical communication with the actuators and configured for automatic control of the aircraft in one or more flight modes; and
a pilot control interface including (i) an electrical resistance network that is selectively switchable between a plurality of states and (ii) a plurality of switches mounted to the control stick for pilot interaction therewith to selectively switch said electrical resistance network between said states such that each state exhibits an output resistance across an output interface that is made up of no more than two conductors that are in electrical communication with the autopilot controller
wherein said autopilot control unit is mounted separate from the control stick and the electrical resistance network is connected to the autopilot control unit by said output interface.

23. The autopilot system of claim 22 wherein the electrical resistance network is a parallel resistance network and includes a null resistor having a finite value that is connected across said two conductors and said autopilot controller is configured for detection of a broken wire condition based on detecting a resistance across the two conductors that is greater than the finite value of the null resistor and, responsive to detecting the broken wire condition, at least issuing a notification to a pilot to take control of the aircraft.

24. The autopilot system of claim 22 wherein an actuation of any one of the switches produces a resistance value across the two conductors that falls within a range of valid resistance values corresponding to said states and said autopilot controller is configured for detecting resistance values across the two conductors that are above said range as being indicative of a broken wire condition and, responsive to detecting the broken wire condition, at least issuing a notification to a pilot to take control of the aircraft.

25. The autopilot system of claim 22 wherein the electrical resistance network is a parallel resistance network and an actuation of any one of the switches produces a resistance value across the two conductors that falls within a range of valid resistance values corresponding to said states and said autopilot controller is configured for detecting resistance values across the two conductors that are below said range as being indicative of a shorted condition and, responsive to detecting the shorted condition, at least issuing a notification to a pilot to take control of the aircraft.

26. The pilot control interface of claim 22 further comprising:
an engage/disengage selector that includes first and second resistors forming part of the electrical resistance network and first and second switches associated with the first and second resistors, respectively, such that a pilot actuation of the engage/disengage selector, during normal operation, changes a state of the first and second switches to electrically connect the first and second resistors to said two conductors to present an engage/disengage resistance across the two conductors.

27. A method for forming a pilot control interface for selective control of an autopilot system by a pilot of an aircraft in which the autopilot system is installed, the aircraft including a control stick operable to manually control the flight of the aircraft and the autopilot system mechanically coupled to the control stick and including an autopilot control unit, said method comprising:
configuring an electrical resistance network for selectively switching between a plurality of states;
mounting a plurality of switches to the control stick;
interfacing the plurality of switches to the electrical resistance network for pilot interaction therewith to selectively switch said electrical resistance network between said states such that each state exhibits an output resistance across an output interface that is made up of no more than two conductors;
mounting said autopilot control unit separate from the control stick; and
connecting the electrical resistance network to the autopilot control unit through said output interface.

* * * * *